United States Patent [19]

Schilling et al.

[11] Patent Number: 5,363,403
[45] Date of Patent: Nov. 8, 1994

[54] SPREAD SPECTRUM CDMA SUBTRACTIVE INTERFERENCE CANCELER AND METHOD

[75] Inventors: Donald L. Schilling, Sands Point; John Kowalski, New York, both of N.Y.

[73] Assignee: InterDigital Technology Corporation, Wilmington, Del.

[21] Appl. No.: 51,017

[22] Filed: Apr. 22, 1993

[51] Int. Cl.[5] .............................................. H04K 1/00
[52] U.S. Cl. ............................................ 375/1; 380/34
[58] Field of Search ................................. 375/1; 380/34

[56] References Cited

U.S. PATENT DOCUMENTS

| | | | |
|---|---|---|---|
| 4,470,138 | 9/1984 | Gutleber | 375/1 X |
| 4,901,307 | 2/1990 | Gilhousen et al. | 370/18 |
| 4,928,274 | 3/1990 | Gilhousen et al. | 370/92 |
| 5,028,887 | 7/1991 | Gilmore | 331/18 |
| 5,099,493 | 3/1992 | Zeger et al. | 375/1 |
| 5,103,459 | 4/1992 | Gilhousen et al. | 375/1 |
| 5,151,919 | 9/1992 | Dent | 375/1 |
| 5,218,619 | 6/1993 | Dent | 375/1 |
| 5,224,122 | 6/1993 | Bruckert | 375/1 |
| 5,237,586 | 8/1993 | Bottomley | 375/1 |

FOREIGN PATENT DOCUMENTS 9306550 4/1993 WIPO ................................ 375/1

OTHER PUBLICATIONS

Pulin Patel and Jack Holtzman "Analysis of a Simple Successive Interference Cancellation Scheme in DS/CDMA System".

Louay M. A. Jalloul and Jack Holtzman, "Performance Analysis of DS/CDMA with Noncoherent M-ary Orthogonal Modulation in Multipath Fading Channels".

*Primary Examiner*—Tod R. Swann
*Attorney, Agent, or Firm*—David Newman & Associates

[57] ABSTRACT

A spread-spectrum code division multiple access interference canceler for reducing interference in a direct sequence CDMA receiver having N chip-code channels. The interference canceler includes a plurality of correlators or matched filters, a plurality of spread-spectrum-processing circuits, subtracting circuits, and channel correlators or channel-matched filters. Using a plurality of chip-code signals, the plurality of correlators despreads the spread-spectrum CDMA signal as a plurality of despread signals, respectively. The plurality of spread-spectrum-processing circuits uses a timed version of the plurality of chip-code signals, for spread-spectrum processing the plurality of despread signals, respectively, with a chip-code-signal corresponding to a respective despread signal. For recovering a code channel using an $i^{th}$ chip-code-signal, the subtracting circuits subtracts from the spread-spectrum CDMA signal, each of the N-1 spread-spectrum-processed-despread signals thereby generating a subtracted signal. The N-1 spread-spectrum-processed-despread signals do not include the spread-spectrum-processed-despread signal of the $i^{th}$ channel of the spread-spectrum CDMA signal. The channel correlator or channel-matched filter despreads the subtracted signal.

25 Claims, 8 Drawing Sheets

SPREAD SPECTRUM CDMA SUBTRACTIVE INTERFERENCE CANCELER AND METHOD

BACKGROUND OF THE INVENTION

This invention relates to spread-spectrum communications, and more particularly to an interference canceler and method for reducing interference in a direct sequence, code division multiple access receiver.

DESCRIPTION OF THE RELEVANT ART

Direct sequence, code division multiple access, spread-spectrum communications systems are capacity limited by interference caused by other simultaneous users. This is compounded if adaptive power control is not used, or is used but is not perfect.

Code division multiple access is interference limited. The more users transmitting simultaneously, the higher the bit error rate (BER). Increased capacity requires forward error correction (FEC) coding, which in turn, increases the data rate and limits capacity.

SUMMARY OF THE INVENTION

A general object of the invention is to reduce noise resulting from N-1 interfering signals in a direct sequence, spread-spectrum code division multiple access receiver.

The present invention, as embodied and broadly described herein, provides a spread-spectrum code division multiple access (CDMA) interference canceler for reducing interference in a spread-spectrum CDMA receiver having N channels. Each of the N channels is spread-spectrum processed by a distinct chip-code signal. The chip-code signal, preferably, is derived from a distinct pseudo-noise (PN) sequence, which may be generated from a distinct chip codeword. The interference canceler partially cancels N-1 interfering CDMA channels, and provides a signal-to-noise ratio (SNR) improvement of approximately N/PG, where PG is the processing gain. Processing gain is the ratio of the chip rate divided by the bit rate. By canceling or reducing interference, the SNR primarily may be due to thermal noise, and residual, interference-produced noise. Thus, the SNR may increase, lowering the BER, which reduces the demand for a FEC encoder/decoder.

The interference canceler, for a particular channel, includes a plurality of despreading means, a plurality of spread-spectrum-processing means, subtracting means, and channel-despreading means. Using a plurality of chip-code signals, the plurality of despreading means despreads the spread-spectrum CDMA signals as a plurality of despread signals, respectively. The plurality of spread-spectrum-processing means uses a timed version of the plurality of chip-code signals, for spread-spectrum processing the plurality of despread signals, respectively, with a chip-code signal corresponding to a respective despread signal. The timed version of a chip-code signal may be generated by delaying the chip-code signal from a chip-code-signal generator. Alternatively, a matched filter may detect a particular PN sequence in the spread-spectrum CDMA signal. A chip-code-signal generator may use the detected signal from the matched filter to trigger a timed version of the chip-code signal.

For recovering a particular CDMA channel using an $i^{th}$ chip-code signal, the subtracting means subtracts from the spread-spectrum CDMA signal, each of the N-1 spread-spectrum-processed-despread signals, thereby generating a subtracted signal. The N-1 spread-spectrum-processed-despread signals do not include the spread-spectrum-processed-despread signal of the $i^{th}$ channel corresponding to the $i^{th}$ chip-code signal. The channel-despreading means despreads the subtracted signal with the $i^{th}$ chip-code signal.

The present invention also includes a method for reducing interference in a spread-spectrum CDMA receiver having N channels. The method comprises the steps of despreading, using a plurality of chip-code signals, the spread-spectrum CDMA signal as a plurality of despread signals, respectively; spread-spectrum processing, using a timed version of the plurality of chip-code signals, the plurality of despread signals, respectively, with a chip-code signal corresponding to a respective despread signal; subtracting from the spread-spectrum CDMA signal, each of the N-1 spread-spectrum-processed-despread signals, with the N-1 spread-spectrum-processed-despread signals not including a spread-spectrum-processed despread signal of the $i^{th}$ channels, thereby generating a subtracted signal; and, despreading the subtracted signal having the $i^{th}$ chip-code signal.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Figure 1:
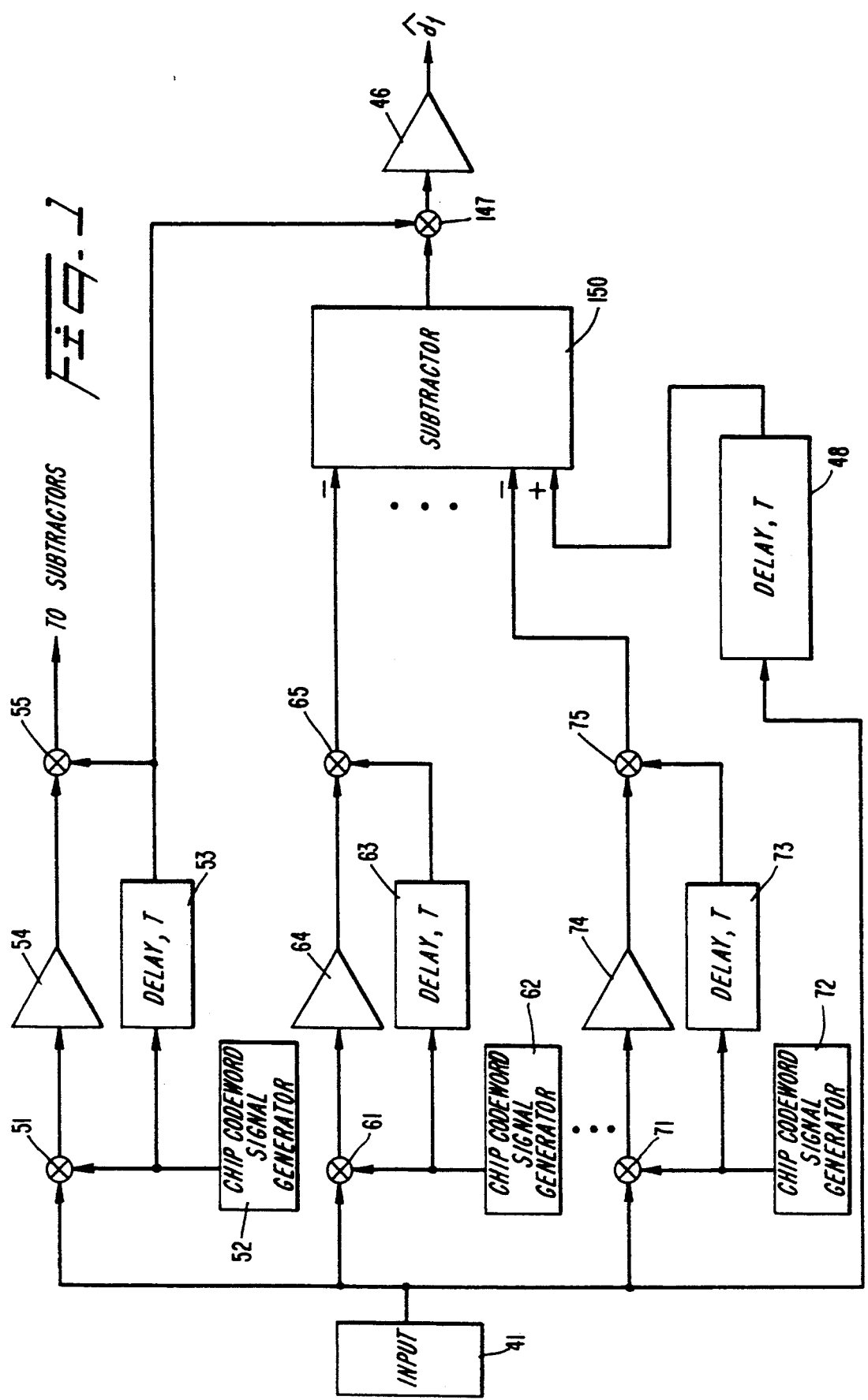
FIG. 1 is a block diagram of the spread-spectrum CDMA interference canceler using correlators.

Reference now is made in detail to the present preferred embodiments of the invention, examples of which are illustrated in the accompanying drawings, wherein like reference numerals indicate like elements throughout the several views.

In the exemplary arrangement shown in FIG. 1, a spread-spectrum code division multiple access (CDMA) interference canceler is provided for reducing interference in a spread-spectrum CDMA receiver having N channels. The present invention also works on a spread-spectrum code division multiplexed (CDM) system. Accordingly, without loss of generality, the term spread-spectrum CDMA signal, as used herein, includes spread-spectrum CDMA signals and spread-spectrum CDM signals. In a personal communications service, the interference canceler may be used at a base station or in a remote unit such as a handset.

FIG. 1 illustrates the interference canceler for the first channel, defined by the first chip-code signal. The interference canceler includes a plurality of despreading means, a plurality of timing means, a plurality of spread-spectrum-processing means, subtracting means, and first channel-despreading means.

Using a plurality of chip-code signals, the plurality of despreading means despreads the received spread-spectrum CDMA signals as a plurality of despread signals, respectively. In FIG. 1 the plurality of despreading means is shown as first despreading means, second despreading means, through $N^{th}$ despreading means. The first despreading means includes a first correlator, which is embodied, by way of example, as a first mixer 51, first chip-code-signal generator 52, and a first integrator 54. The first integrator 54 alternatively may be a first lowpass filter or a first bandpass filter. The first mixer 51 is coupled between the input 41 and the first chip-code-signal generator 52 and the first integrator 54.

The second despreading means includes a second correlator, which is embodied, by way of example, as second mixer 61, second chip-code-signal generator 62 and second integrator 64. The second integrator 64 alternatively may be a second lowpass filter or a second bandpass filter. The second mixer 61, is coupled between the input 41, the second chip-code-signal generator 62, and the second integrator 64.

The $N^{th}$ despreading means is depicted as an $N^{th}$ correlator shown, by way of example, as $N^{th}$ mixer 71, and $N^{th}$ chip-code-signal generator 72, and $N^{th}$ integrator 74. The $N^{th}$ integrator 74 alternatively may be an $N^{th}$ lowpass filter or an $N^{th}$ bandpass filter. The $N^{th}$ mixer 71 is coupled between the input 41, the $N^{th}$ chip-code-signal generator 72 and the $N^{th}$ integrator 74.

As is well known in the art, the first through $N^{th}$ despreading means may be embodied as any device which can despread a channel in a spread-spectrum signal.

The plurality of timing means may be embodied as a plurality of delay devices 53, 63, 73. A first delay device 53 has a delay time T, which is approximately the same as the integration time $T_b$ of first integrator 54, or time constant of the first lowpass filter or first bandpass filter. A second delay device 63 has a time delay T, which is approximately the same as the integration time $T_b$ of second integrator 64, or time constant of the second lowpass filter or second bandpass filter. Similarly, the $N^{th}$ delay device 73 has a time delay T, which is approximately the same as the integration time $T_b$ of $N^{th}$ integrator 74, or time constant of the $N^{th}$ lowpass filter or $N^{th}$ bandpass filter. Typically, the integration times of the first integrator 54, second integrator 64 through $N^{th}$ integrator 74 are the same. If lowpass filters are used, then typically the time constants of the first lowpass filter, second lowpass filter through $N^{th}$ lowpass filter are the same. If bandpass filters are used, then the time constants of the first bandpass filter, second bandpass filter through $N^{th}$ bandpass filter are the same.

The plurality of spread-spectrum-processing means regenerates each of the plurality of despread signals as a plurality of spread-spectrum signals. The plurality of spread-spectrum-processing means uses a timed version, i.e. delayed version, of the plurality of chip-code signals, for spread-spectrum processing the plurality of despread signals, respectively, with a chip-code signal corresponding to a respective despread signal. The plurality of spread-spectrum-processing means is shown, by way of example, as a first processing mixer 55, a second processing mixer 65, through an $N^{th}$ processing mixer 75. The first processing mixer 55 is coupled to the first integrator 54, and through a first delay device 53 to the first chip-code-signal generator 52. The second processing mixer 65 is coupled to the second integrator 64, and through the second delay device 63 to the second chip-code-signal generator 62. The $N^{th}$ processing mixer 75 is coupled to the $N^{th}$ integrator 74 through the delay device 73 to the $N^{th}$ chip-code-signal generator 72.

For reducing interference to a channel using an $i^{th}$ chip-code signal of the spread-spectrum CDMA signal, the subtracting means subtracts, from the spread-spectrum CDMA signal, each of the N-1 spread-spectrum-processed-despread signals not corresponding to the $i^{th}$ channel. The subtracting means thereby generates a subtracted signal. The subtracting means is shown as a first subtractor 150. The first subtractor 150 is shown coupled to the output of the second processing mixer 65, through the $N^{th}$ processing mixer 75. Additionally, the first subtractor 150 is coupled through a main delay device 48 to the input 41.

The $i^{th}$ channel-despreading means despreads the subtracted signal with the $i^{th}$ chip-code signal as the $i^{th}$ channel. The first channel-despreading means is shown as a first channel mixer 147. The first channel mixer 147 is coupled to the first delay device 53, and to the first subtractor 150. The first channel integrator 146 is coupled to the first channel mixer 147.

The first chip-code-signal generator 52, the second chip-code-signal generator 62, through the $N^{th}$ chip-code-signal generator 72 generate a first chip-code signal, a second chip-code signal, through a $N^{th}$ chip-code signal, respectively. The term "chip-code signal" is used herein to mean the spreading signal of a spread-spectrum signal, as is well known in the art. Typically the chip-code signal is generated from a pseudo-random (PN) sequence. The first chip-code signal, the second chip code signal, through the $N^{th}$ chip-code signal might be generated from a first PN sequence, a second PN sequence, through a $N^{th}$ PN sequence, respectively. The first PN sequence is defined by or generated from a first chip codeword, the second PN sequence is defined by or generated from a second chip codeword, through the $N^{th}$ PN sequence is defined by or generated from a $N^{th}$ chip-codeword. Each of the first chip codeword, second chip codeword through $N^{th}$ chip codeword is distinct, i.e. different from one another. In general, a chip codeword can be the actual sequence of a PN sequence, or used to define settings for generating the PN sequence. The settings might be the delay taps of shift registers, for example.

A first channel of a received spread-spectrum CDMA signal at input 41 is despread by first mixer 51 as a first despread signal, using the first chip-code signal generated by first chip-code-signal generator 52. The first despread signal from the first mixer 51 is filtered through first integrator 54. First integrator 54 integrates for a time $T_b$, the time duration of a symbol such as a bit. At the same time, the first chip-code signal is delayed by time T by delay device 53. The delay time T is approximately equal to the integration time $T_b$ plus system or component delays. Systems or component delays are usually small, compared to integration time $T_b$.

The delayed version of the first chip-code signal is processed with the first despread signal from the output of the first integrator 54 using the first spreading mixer 55. The output of the first spreading mixer 55 is fed to subtractors other than first subtractor 150 for processing the second through $N^{th}$ channels of the spread-spectrum CDMA signal.

For reducing interference to the first channel of the spread-spectrum CDMA signal, the received spread-spectrum CDMA signal is processed by the second through $N^{th}$ despreaders as follows. The second channel of the spread-spectrum CDMA signal is despread by the second despreading means. At the second mixer 61, a second chip-code signal, generated by the second chip-code-signal generator 62, despreads the second channel of the spread-spectrum CDMA signal. The despread second channel is filtered through second integrator 64. The output of the second integrator 64 is the second despread signal. The second despread signal is spread-spectrum processed by second processing mixer 65 by a delayed version of the second chip-code signal. The second chip-code signal is delayed through delay device 63. The delay device 63 delays the second chip-code signal by time T. The second channel mixer 65 spread-spectrum processes a timed version, i.e. delayed version, of the second chip-code signal with the filtered version of the second spread-spectrum channel from second integrator 64. The term "spread-spectrum process" as used herein includes any method for generating a spread-spectrum signal by mixing or modulating a signal with a chip-code signal. Spread-spectrum processing may be done by product devices, EXCLUSIVE-OR gates, matched filters, or any other device or circuit as is well known in the art.

Similarly, the $N^{th}$ channel of the spread-spectrum CDMA signal is despread by the $N^{th}$ despreading means. Accordingly, the received spread-spectrum CDMA signal has the $N^{th}$ channel despread by $N^{th}$ mixer 71, by mixing the spread-spectrum CDMA signal with the $N^{th}$ chip-code signal from $N^{th}$ chip-code-signal generator 72. The output of the $N^{th}$ mixer 71 is filtered by $N^{th}$ integrator 74. The output of the $N^{th}$ integrator 74, which is the $N^{th}$ despread signal, is a despread and filtered version of the $N^{th}$ channel of the spread-spectrum CDMA signal. The $N^{th}$ despread signal is spread-spectrum processed by a delayed version of the $N^{th}$ chip-code signal. The $N^{th}$ chip-code signal is delayed through $N^{th}$ delay device 73. The $N^{th}$ processing mixer 75 spread-spectrum processes the timed version, i.e. a delayed version, of the $N^{th}$ chip-code signal with the $N^{th}$ despread signal.

At the first subtractor 150, each of the outputs of the second processing mixer 65 through the $N^{th}$ processing mixer 75 is subtracted from a timed version, i.e. a delayed version, of the spread-spectrum CDMA signal from input 41. The delay of the spread-spectrum CDMA signal is timed through the first main delay device 48. Typically, the delay of the first main delay device 48 is time T, which is approximately equal to the integration time of the first integrator 54 through $N^{th}$ integrator 74.

At the output of the first subtractor 150, is generated a first subtracted signal. The first subtracted signal, for the first channel of the spread-spectrum CDMA signal, is defined herein to be the outputs from the second processing mixer 65 through $N^{th}$ processing mixer 75, subtracted from the delayed version of the spread-spectrum CDMA signal. The second subtracted signal through $N^{th}$ subtracted signal are similarly defined.

The delayed version of the first chip-code signal from the output of first delay device 53 is used to despread the output of the first subtractor 150. Accordingly, the first subtracted signal is despread by the first chip-code signal by first channel mixer 147. The output of the first channel mixer 147 is filtered by first channel integrator 147. This produces an output estimate $d_1$ of the first channel of the spread-spectrum CDMA signal.

Figure 2:
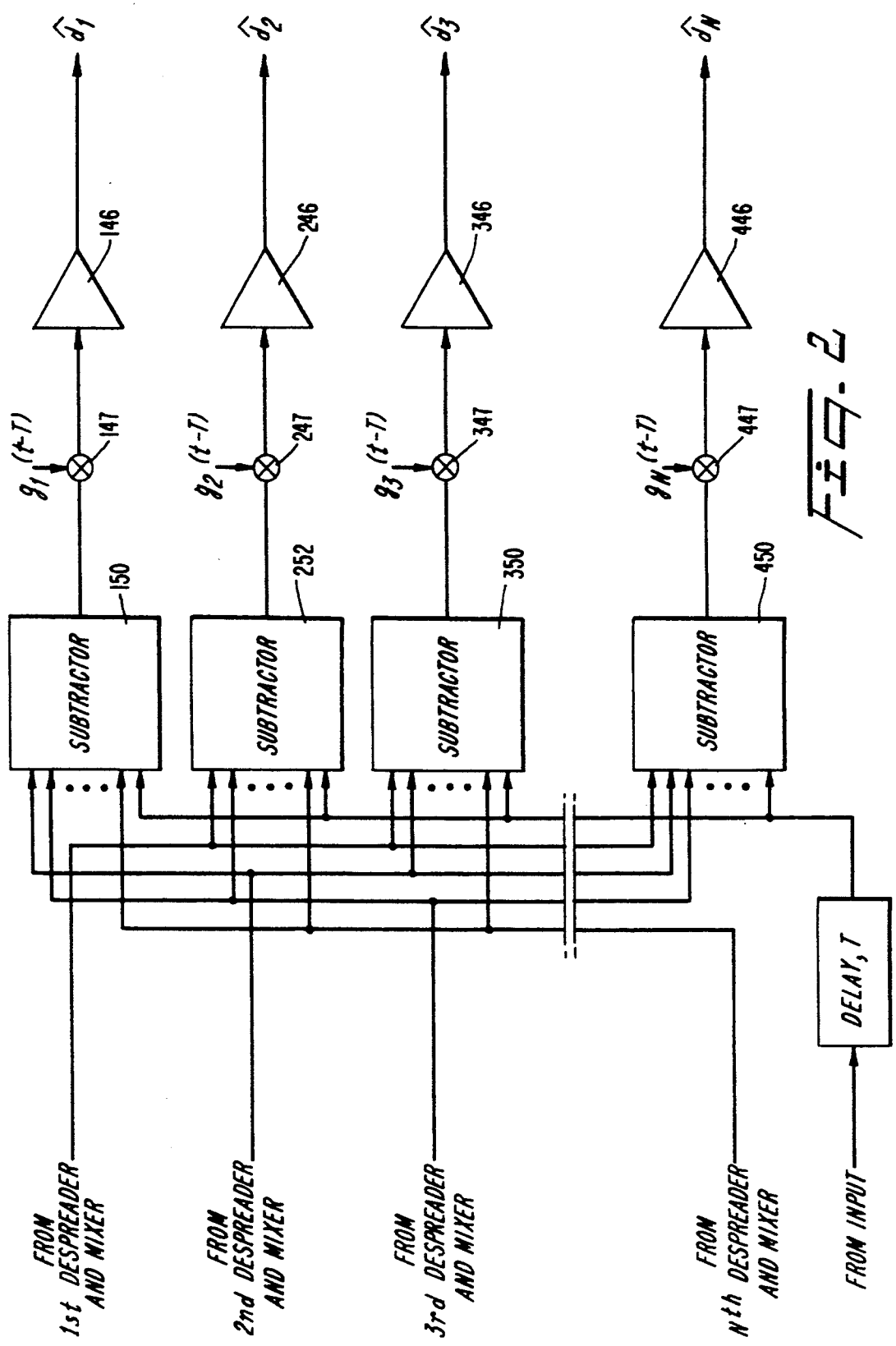
FIG. 2 is a block diagram of the spread-spectrum CDMA interference canceler for processing multiple channels using correlators.

As illustratively shown in FIG. 2, a plurality of subtractors 150, 250, 350, 450 can be coupled appropriately to the input 41 and to a first spreading mixer 55, second spreading mixer 65, third spreading mixer, through an $N^{th}$ spreading mixer 75 of FIG. 1. The plurality of subtractors 150, 250, 350, 450 also are coupled to the main delay device 48 from the input 41. This arrangement can generate a first subtracted signal from the first subtractor 150, a second subtracted signal from the second subtractor 250, a third subtracted signal from the third subtractor 350, through an $N^{th}$ subtracted signal from an $N^{th}$ subtractor 450.

The outputs of the first subtractor 150, second subtractor 250, third subtractor 350, through the $N^{th}$ subtractor 450 are each coupled to a respective first channel mixer 147, second channel mixer 247, third channel mixer 347, through $N^{th}$ channel mixer 447. Each of the channel mixers is coupled to a delayed version of the first chip-code signal, $g_1(t-T)$, second chip-code signal, $g_2(t-T)$, third chip-code signal, $g_3(t-T)$, through $N^{th}$ chip-code signal, $g_N(t-T)$. The outputs of each of the respective first channel mixer 147, second channel mixer 247, third channel mixer 347, through $N^{th}$ channel mixer 447 are coupled to a first channel integrator 146, second channel integrator 246, third channel integrator 346 through $N^{th}$ channel integrator 446, respectively. At the output of each of the channel integrators is produced an estimate of the respective first channel $d_1$, second channel $d_2$, third channel $d_3$, through $N^{th}$ channel $d_N$.

Referring to FIG. 1, use of the present invention is illustrated for the first channel of the spread-spectrum CDMA signal, with the understanding that the second through $N^{th}$ CDMA channels work similarly. A received spread-spectrum CDMA signal at input 41 is delayed by delay device 48 and fed to the first subtractor 150. The spread-spectrum CDMA signal has the second channel through $N^{th}$ channel despread by second mixer 61 using the second chip-code signal, through the $N^{th}$ mixer 71 using the $N^{th}$ chip-code signal. The respective second chip-code signal through the $N^{th}$ chip-code signal are generated by the second chip-code-signal generator 62 through the $N^{th}$ chip-code-signal generator 72. The second channel through $N^{th}$ channel are despread and filtered through the second integrator 64 through the $N^{th}$ integrator 74, respectively. The despreading removes, partially or totally, the nondespread channels at the outputs of each of the second integrator 64 through N$^{th}$ integrator 74.

In a preferred embodiment, each of the chip-code signal used for the first chip-code-signal generator 52, second chip-code-signal generator 62 through the N$^{th}$ chip-code-signal generator 72, are orthogonal to each other. Use of chip-code signals having orthogonality however, is not required for operation of the present invention. When using orthogonal chip-code signals, the despread signals have the respective channel plus noise at the output of each of the integrators. With orthogonal chip-code signals, theoretically the mixers remove channels orthogonal to the despread channel. The respective channel is spread-spectrum processed by the respective processing mixer.

Figure 3:
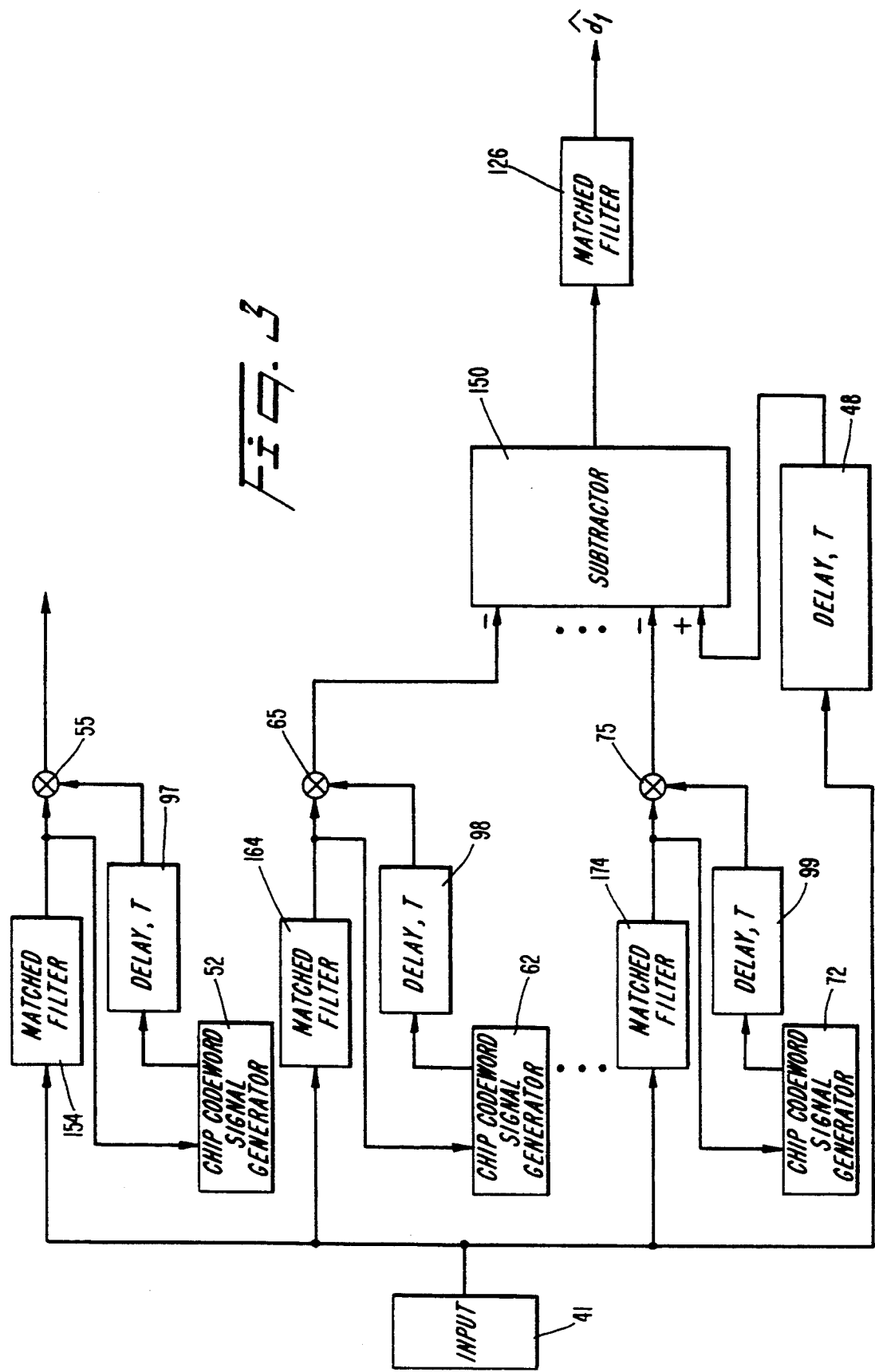
FIG. 3 is a block diagram of the spread-spectrum CDMA interference canceler using matched filters.

At the output of the second processing mixer 65 through the N$^{th}$ processing mixer 75 is a respread version of the second channel through the N$^{th}$ channel, plus noise components contained therein. Each of the second channel through N$^{th}$ channel is then subtracted from the received spread-spectrum CDMA signal by the first subtractor 150. The first subtractor 150 produces the first subtracted signal. The first subtracted signal is despread by a delayed version of the first chip-code signal by first channel mixer 147, and filtered by first channel filter 146. Accordingly, prior to despreading the first channel of the spread-spectrum CDMA signal, the second through N$^{th}$ channels plus noise components aligned with these channels are subtracted from the received spread-spectrum CDMA signal. As illustratively shown in FIG. 3, an alternative embodiment of the spread-spectrum CDMA interference canceler includes a plurality of first despreading means, a plurality of spread-spectrum-processing means, subtracting means, and second despreading means. In FIG. 3, the plurality of despreading means is shown as first despreading means, second despreading means through N$^{th}$ despreading means. The first despreading means is embodied as a first matched filter 154. The first matched filter 154 has an impulse response matched to the first chip-code signal, which is used to spread-spectrum process and define the first channel of the spread-spectrum CDMA signal. The first matched filter 154 is coupled to the input 41.

The second despreading means is shown as second matched filter 164. The second matched filter 164 has an impulse response matched to the second chip-code signal, which is used to spread-spectrum process and define the second channel of the spread-spectrum CDMA signal. The second matched filter 164 is coupled to the input 41.

The N$^{th}$ despreading means is shown an N$^{th}$ matched filter 174. The N$^{th}$ matched filter has an impulse response matched to the N$^{th}$ chip-code signal, which is used to spread-spectrum process and define the N$^{th}$ channel of the spread-spectrum CDMA signal. The N$^{th}$ matched filter is coupled to the input 41.

The term matched filter, as used herein, includes any type of matched filter that can be matched to a chip-code signal. The matched filter may be a digital dematched filter or analog matched filter. A surface acoustic wave (SAW) device may be used at a radio frequency (RF) or intermediate frequency (IF). Digital signal processors and application specific integrated circuits (ASIC) having matched filters may be used at RF, IF or baseband frequency.

In FIG. 3, the plurality of spread-spectrum-processing means is shown as the first processing mixer 55, the second processing mixer 65, through the N$^{th}$ processing mixer 75. The first processing mixer 55 may be coupled through a first adjustment device 97 to the first chip-code-signal generator 52. The second processing mixer 65 may be coupled through the second adjustment device 98 to the second chip-code-signal generator 62. The N$^{th}$ processing mixer 75 may be coupled through the N$^{th}$ adjustment device 73 to the N$^{th}$ chip-code-signal generator 72. The first adjustment device 97, second adjustment device 98 through N$^{th}$ adjustment device 99 are optional, and are used as an adjustment for aligning the first chip-code signal, second chip-code signal through N$^{th}$ chip-code signal with the first despread signal, second despread signal through N$^{th}$ despread signal, outputted from the first matched filter 154, second matched filter 164 through N$^{th}$ matched filter 174, respectively.

The subtracting means is shown as the first subtractor 150. The first subtractor 150 is coupled to the output of the second processing mixer 65, through the N$^{th}$ processing mixer 75. Additionally, the first subtractor 150 is coupled through the main delay device 48 to the input 41.

The first channel-despreading means is shown as a first channel-matched filter 126. The first channel-matched filter 126 is coupled to the first subtractor 150. The first channel-matched filter 126 has an impulse response matched to the first chip-code signal.

A first channel of a received spread-spectrum CDMA signal, at input 41, is despread by first matched filter 154. The first matched filter 154 has an impulse response matched to the first chip-code signal. The first chip-code signal defines the first channel of the spread-spectrum CDMA signal, and is used by the first chip-code-signal generator 52. The first chip-code signal may be delayed by adjustment time $\tau$ by adjustment device 97. The output of the first matched filter 154 is spread-spectrum processed by the first processing mixer 55 with the first chip-code signal. The output of the first processing mixer 55 is fed to subtractors other than the first subtractor 150 for processing the second channel through N$^{th}$ channel of the spread-spectrum CDMA signals.

For reducing interference to the first spread-spectrum channel, the received spread-spectrum CDMA signal is processed by the second despreading means through N$^{th}$ despreading means as follows. The second matched filter 164 has an impulse response matched to the second chip-code signal. The second chip-code signal defines the second channel of the spread-spectrum CDMA signal, and is used by the second chip-code-signal generator 62. The second matched filter 164 despreads the second channel of the spread-spectrum CDMA signal. The output of the second matched filter 164 is the second despread signal. The second despread signal triggers second chip-code-signal generator 62. The second despread signal also is spread-spectrum processed by second processing mixer 65 by a timed version of the second chip-code signal. The timing of the second chip-code signal triggers the second despread signal from the second matched filter 164.

Similarly, the N$^{th}$ channel of the spread-spectrum CDMA signal is despread by the N$^{th}$ despreading means. Accordingly, the received spread-spectrum CDMA signal has the N$^{th}$ channel despread by N$^{th}$ matched filter 174. The output of the N$^{th}$ matched filter 174 is the N$^{th}$ despread signal, i.e. a despread and filtered version of the N$^{th}$ channel of the spread-spectrum CDMA signal. The $N^{th}$ despread signal is spread-spectrum processed by a timed version of the $N^{th}$ chip-code signal. The timing of the $N^{th}$ chip-code signal is triggered by the $N^{th}$ despread signal from the $N^{th}$ matched filter 174. The $N^{th}$ processing mixer 75 spread-spectrum processes the timed version of the $N^{th}$ chip-code signal with the $N^{th}$ despread signal.

At the first subtractor 150, each of the outputs of the second processing mixer 65 through the $N^{th}$ processing mixer 75 are subtracted from a delayed version of the spread-spectrum CDMA signal from input 41. The delay of the spread-spectrum CDMA signal is timed through delay device 48. The time of delay device 48 is set to align the second through $N^{th}$ spread-spectrum-processed-despread signals for subtraction from the spread-spectrum CDMA signal. This generates at the output of the first subtractor 150, a first subtracted signal. The subtracted signal is despread by the first channel-matched filter 126. This produces an output estimate $d_1$ of the first channel of the spread-spectrum CDMA signal.

Figure 4:
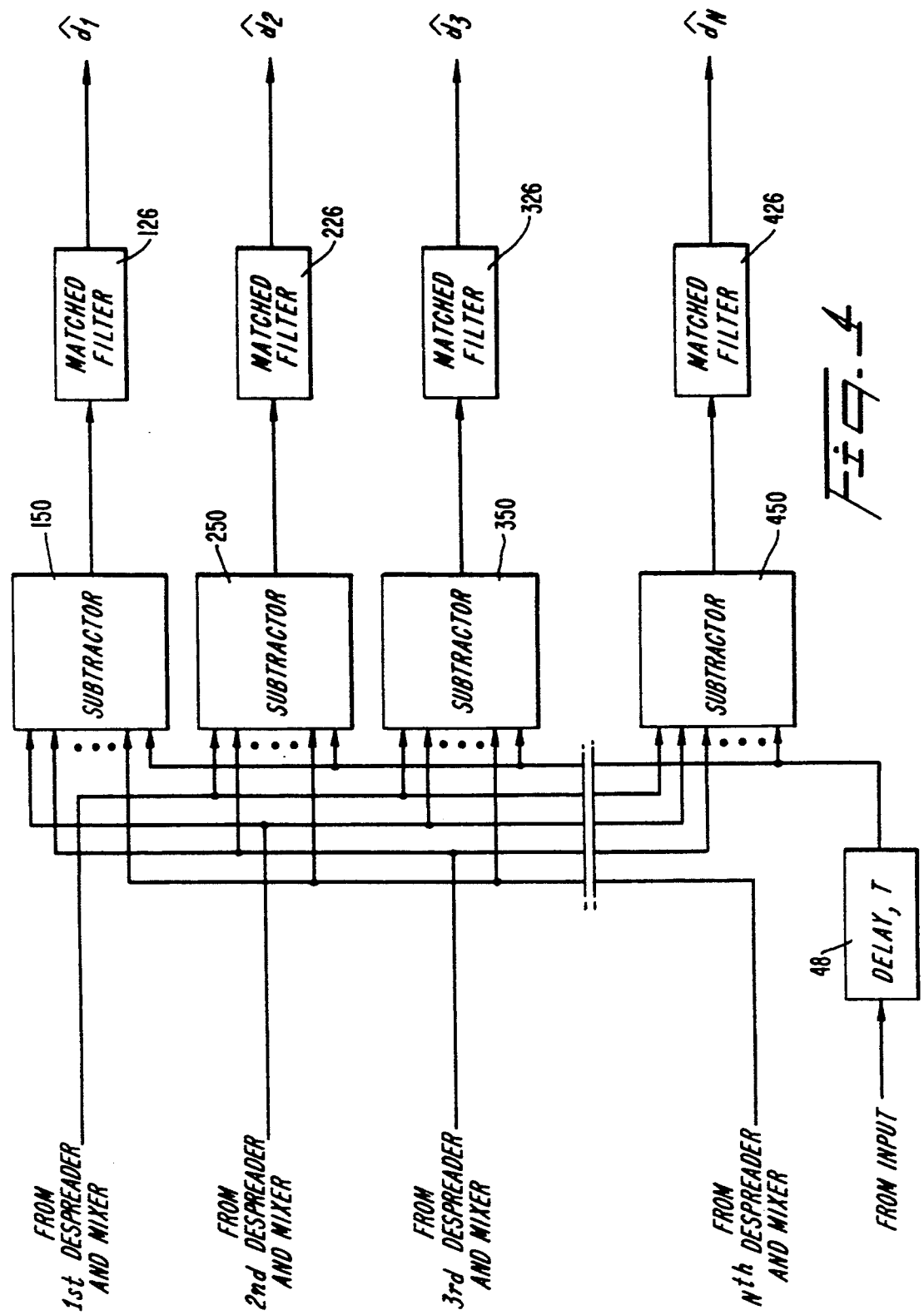
FIG. 4 is a block diagram of the spread-spectrum CDMA interference canceler for processing multiple channels using matched filters.

As illustrated in FIG. 4, a plurality of subtractors 150, 250, 350, 450 can be coupled appropriately to the output from a first processing mixer, second processing mixer, third processing mixer, through a $N^{th}$ processing mixer, and to a main delay device from the input. A first subtracted signal is outputted from the first subtractor 150, a second subtracted signal is outputted from the second subtractor 250, a third subtracted signal is outputted from the third subtractor 350, through an $N^{th}$ subtractor signal is outputted from an $N^{th}$ subtractor 450.

The output of the first subtractor 150, second subtractor 250, third subtractor 350, through the $N^{th}$ subtractor 450 are each coupled to a respective first channel-matched filter 126, second channel-matched filter 226, third channel-matched filter 326, through $N^{th}$ channel-matched filter 426. The first channel-matched filter 126, second channel-matched filter 226, third channel-matched filter 326 through $N^{th}$ channel-matched filter 426 have an impulse response matched the first chip-code signal, second chip-code signal, third chip-code signal, through $N^{th}$ chip-code signal, defining the first channel, second channel, third channel through $N^{th}$ channel, respectively, of the spread-spectrum CDMA signal. At each of the outputs of the respective first channel-matched filter 126, second channel-matched filter 226, third channel-matched filter 326, through $N^{th}$ channel-matched filter 426, is produced an estimate of the respective first channel $d_1$, second channel $d_2$, third channel $d_3$, through $N^{th}$ channel $d_n$.

In use, the present invention is illustrated for the first channel of the spread-spectrum CDMA signal, with the understanding that the second channel through $N^{th}$ channel work similarly. A received spread-spectrum CDMA signal at input 41 is delayed by delay device 48 and fed to subtractor 150. The same spread-spectrum CDMA signal has the second through $N^{th}$ channel despread by the second matched filter 164 through the $N^{th}$ matched filter 174. This despreading removes the other CDMA channels from the respective despread channel. In a preferred embodiment, each of the chip-code signals used for the first channel, second channel, through the $N^{th}$ channel, is orthogonal to the other chip-code signals. At the output of the first matched filter 154, second matched filter 164 through $N^{th}$ matched filter 174, are the first despread signal, second despread signal through $N^{th}$ despread signal, plus noise.

The respective channel is spread-spectrum processed by the processing mixers. Accordingly, at the output of the second processing mixer 65 through the $N^{th}$ processing mixer 75 is a spread version of the second despread signal through the $N^{th}$ despread signal, plus noise components contained therein. Each of the spread-spectrum-processed-despread signals, is then subtracted from the received spread-spectrum CDMA signal by the first subtractor 150. This produces the first subtracted signal.

The first subtracted signal is despread by first channel-matched filter 126. Accordingly, prior to despreading the first channel of the spread-spectrum CDMA signal, the second channel through $N^{th}$ channel plus noise components aligned with these channels, are subtracted from the received spread-spectrum CDMA signal.

As is well known in the art, correlators and matched filters may be interchanged to accomplish the same function. FIGS. 1 and 3 show alternate embodiments using correlators or matched filters. The arrangements may be varied. For example, the plurality of despreading means may be embodied as a plurality of matched filters, while the channel despreading means may be embodied as a correlator. Alternatively, the plurality of despreading means may be a combination of matched filters and correlators. Also, the spread-spectrum-processing means my be embodied as a matched filter or SAW, or as EXCLUSIVE-OR gates or other devices for mixing a despread signal with a chip-code signal. As is well known in the art, any spread-spectrum despreader or demodulator may despread the spread-spectrum CDMA signal. The particular circuits shown in FIGS. 1–4 illustrate the invention by way of example.

Figure 5:
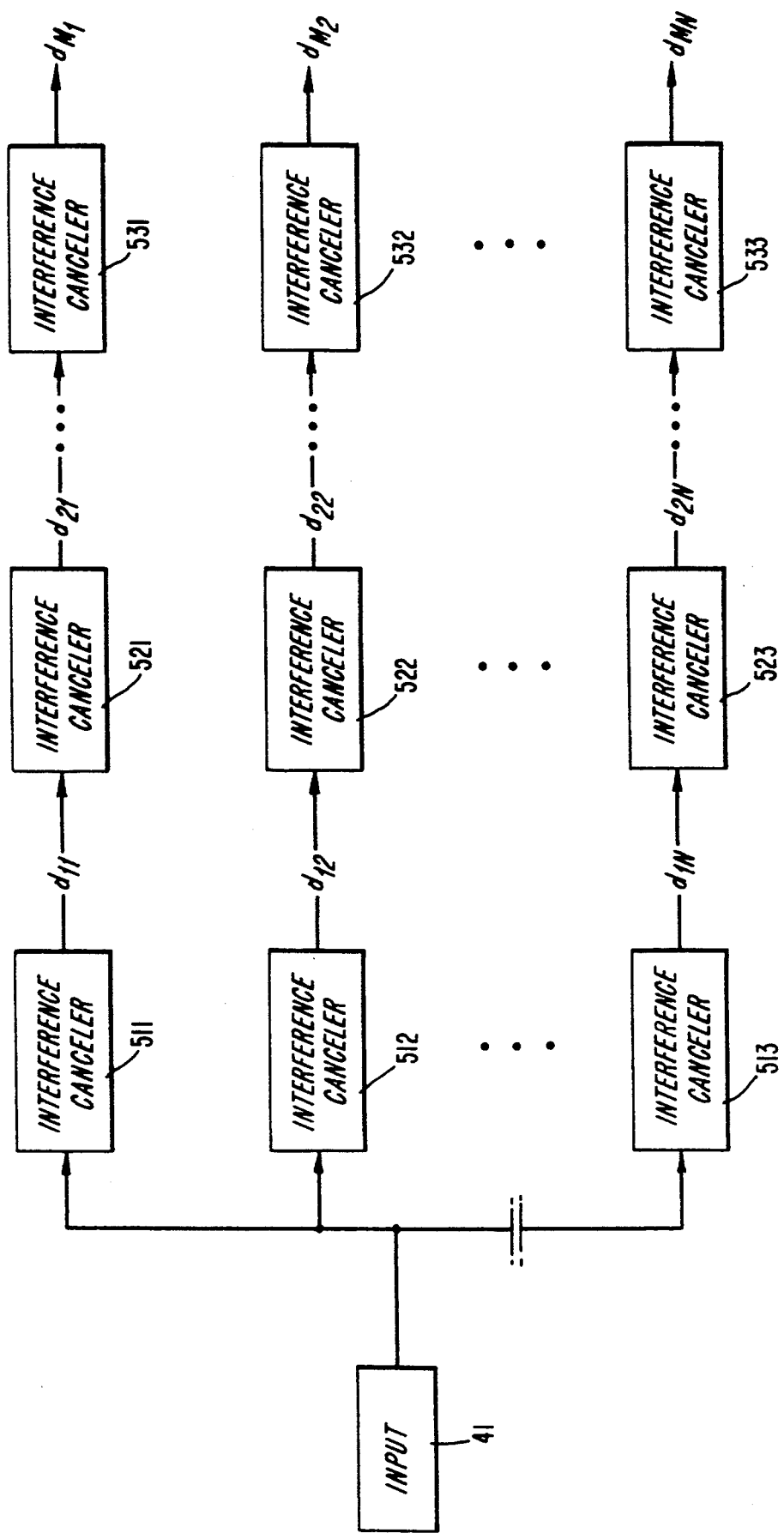
FIG. 5 is a block diagram of the spread-spectrum CDMA interference canceler having multiple iterations for processing multiple channels.

The concepts taught in FIGS. 1–4 may be repeated, as shown in FIG. 5. FIG. 5 illustrates a first plurality of interference cancelers 511, 512, 513, a second plurality of interference cancelers 521, 522, 523, through an $N^{th}$ plurality of interference cancelers 531, 532, 533. Each plurality of interference cancelers includes appropriate elements as already disclosed, and referring to FIGS. 1–4. The input is delayed through a delay device in each interference canceler.

The received spread-spectrum CDMA signal has interference canceled initially by the first plurality of interference cancelers 511, 512, 513, thereby producing a first set of estimates, i.e. a first estimate $d_{11}$, a second estimate $d_{12}$, through an $N^{th}$ estimate $d_{1N}$, of the first channel, second channel through the $N^{th}$ channel, of the spread-spectrum CDMA signal. The first set of estimates can have interference canceled by the second plurality of interference cancelers 521, 522, 523. The first set of estimates $d_{11}, d_{12}, \ldots, d_{1N}$, of the first channel, second channel through $N^{th}$ channel, are input to the second plurality of interference cancelers, interference canceler 521, interference canceler 522 through $N^{th}$ interference canceler 523 of the second plurality of interference cancelers. The second plurality of interference cancelers thereby produce a second set of estimates, i.e. $d_{21}, d_{22}, \ldots, d_{2N}$, of the first channel, second channel, through $N^{th}$ channel. Similarly, the second set estimates can pass through a third plurality of interference cancelers, and ultimately through an $M^{th}$ set of interference cancelers 531, 532, 533, respectively.

The present invention also includes a method for reducing interference in a spread-spectrum CDMA receiver having N chip-code channels. Each of the N channels is identified by a distinct chip-code signal. The method comprises the steps of despreading, using a plurality of chip-code signals, the spread-spectrum CDMA signal as a plurality of despread signals, respectively. Using a timed version of the plurality of chip-code signals, the plurality of despread signals are spread-spectrum processed with a chip-code signal corresponding to a respective despread signal. Each of the N-1 spread-spectrum-processed-despread signals, is subtracted from the spread-spectrum CDMA signal, with the N-1 spread-spectrum-processed-despread signals not including a spread-spectrum-processed signal of the $i^{th}$ despread signal, thereby generating a subtracted signal. The subtracted signal is despread to generate the $i^{th}$ channel.

The probability of error $P_e$ for direct sequence, spread-spectrum CDMA system is:

$$P_e = \tfrac{1}{2}\operatorname{erfc}(\alpha SNR)^{\tfrac{1}{2}}$$

where erfc is complementary error function, SNR is signal-to-noise ratio, and $1 \leq \alpha \leq 2$. The value of e depends on how a particular interference canceler system is designed.

The SNR after interference cancellation and method is given by:

$$SNR = \frac{(PG/N)^{R+1}}{1 + (PG/N)^{R+1}\frac{1}{E_b/\eta}\frac{1-(N/PG)^{R+1}}{1-N/PG}}$$

where N is the number of channels, PG is the processing gain, R is the number of repetitions of the interference canceler, $E_b$ is energy per information bit and $\eta$ is noise power spectral density.

Figure 6:
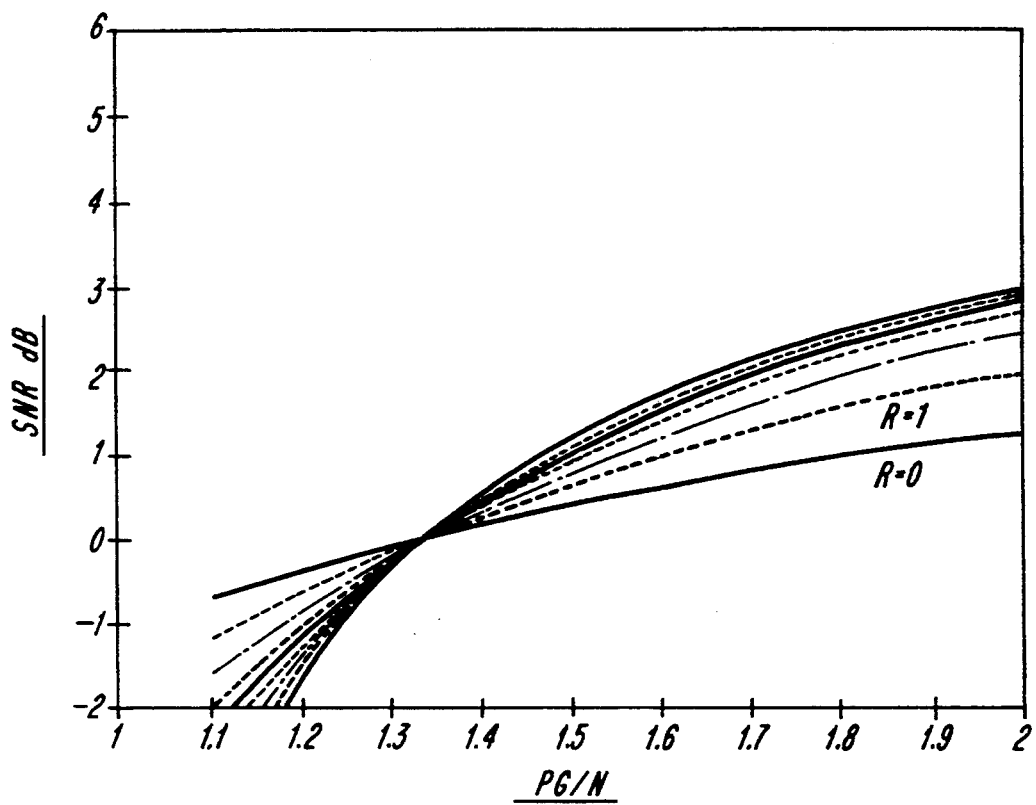
FIG. 6 illustrates theoretical performance characteristic for $E_b/\eta = 6$ dB.

FIG. 6 illustrates theoretical performance characteristic, of the interference canceler and method for when $E_b/\eta = 6$ dB. The performance characteristic is illustrated for SNR out of the interference canceler, versus PG/N. The lowest curve, for R=0, is the performance without the interference canceler. The curves, for R=1 and R=2, illustrates improved performance for using one and two iterations of the interference canceler as shown in FIG. 5. As PG/N→1, there is insufficient SNR to operate. If PG>N, then the output SNR from the interference canceler approaches $E_b/\eta$. Further, if $(N/PG)^{R+1} << 1$, then $$SNR \rightarrow (E_b/\eta)(1-N/PG).$$

Figure 7:
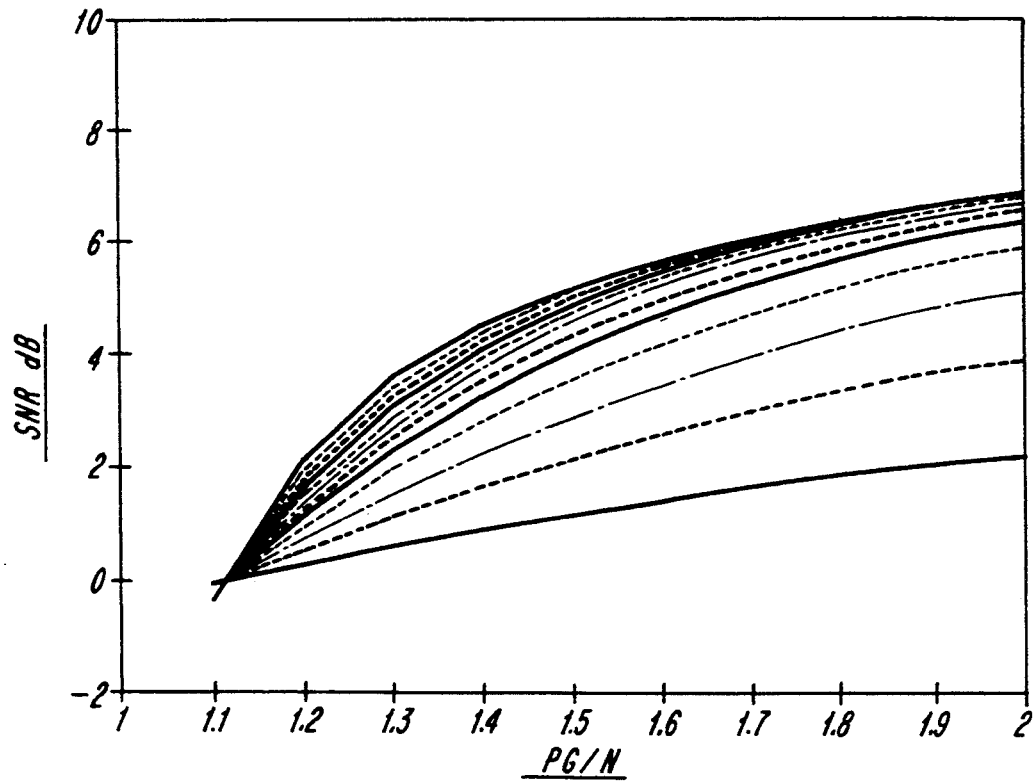
FIG. 7 illustrates theoretical performance characteristic for $E_b/\eta = 10$ dB.

FIG. 7 illustrates the performance characteristic for when $E_b/\eta = 10$ dB. FIG. 7 illustrates that three iterations of the interference canceler can yield a 4 dB improvement with PG/N=2.

Figure 8:
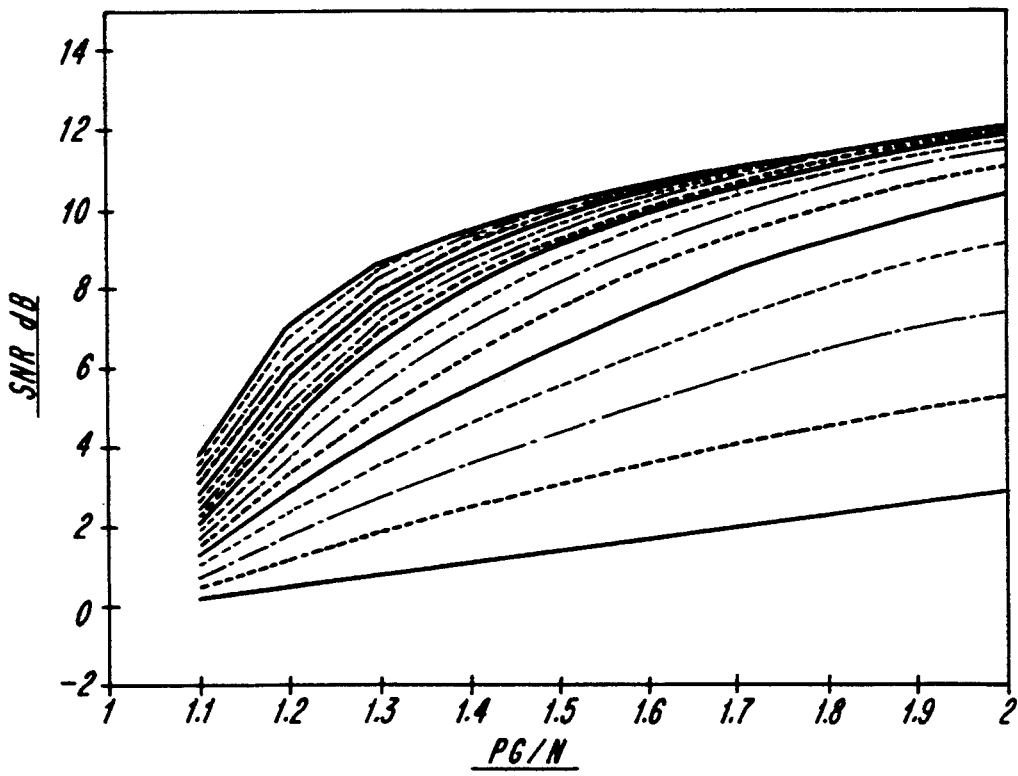
FIG. 8 illustrates theoretical performance characteristic for $E_b/\eta = 15$ dB.

FIG. 8 illustrates the performance characteristic for when $E_b/\eta = 15$ dB. With this bit energy to noise ratio, two iterations of the interference canceler can yield 6 dB improvement for PG/N=2.

Figure 9:
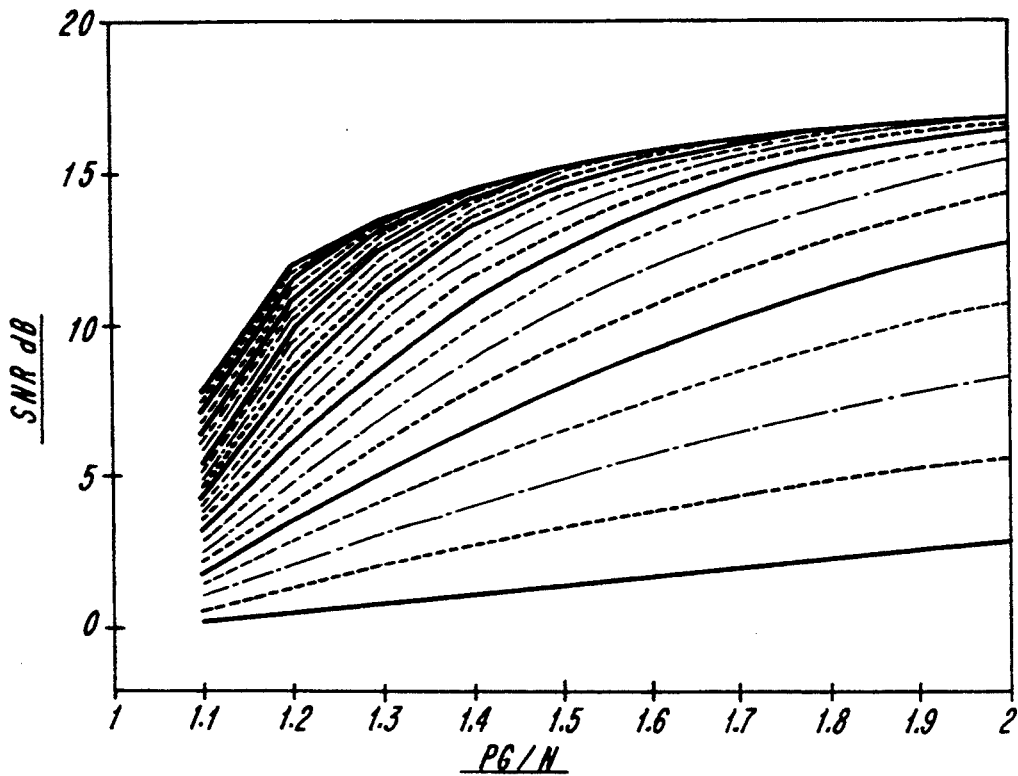
FIG. 9 illustrates theoretical performance characteristic for $E_b/\eta = 20$ dB.
Figure 10:
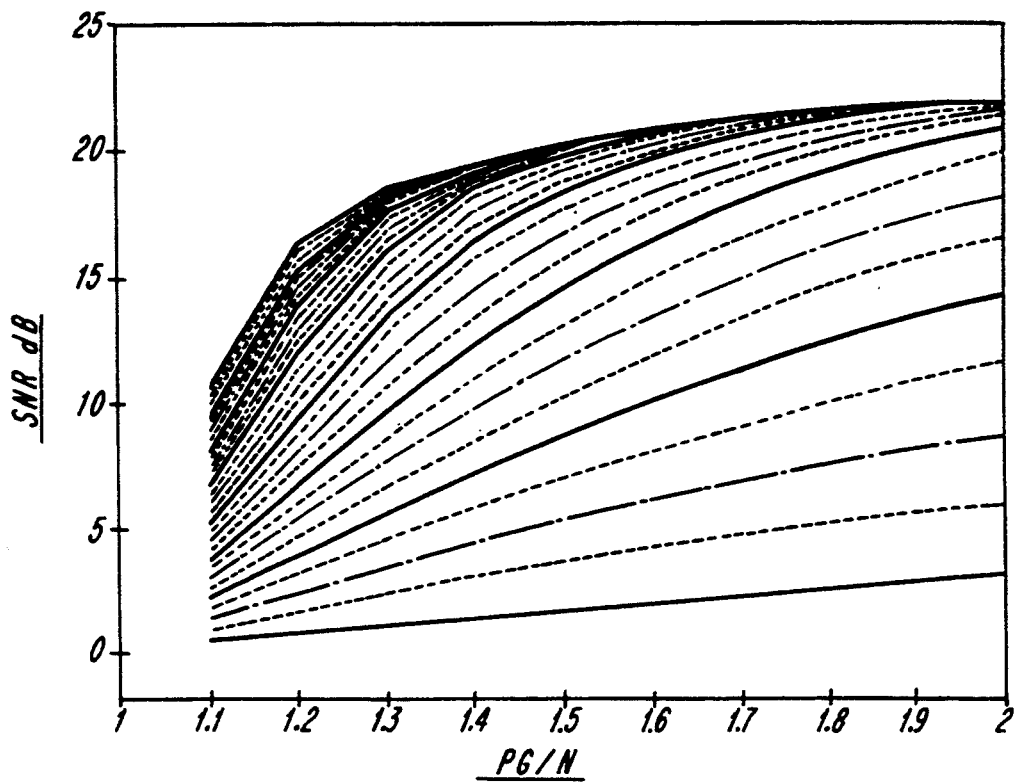
FIG. 10 illustrates theoretical performance characteristic for $E_b/\eta = 25$ dB.
Figure 11:
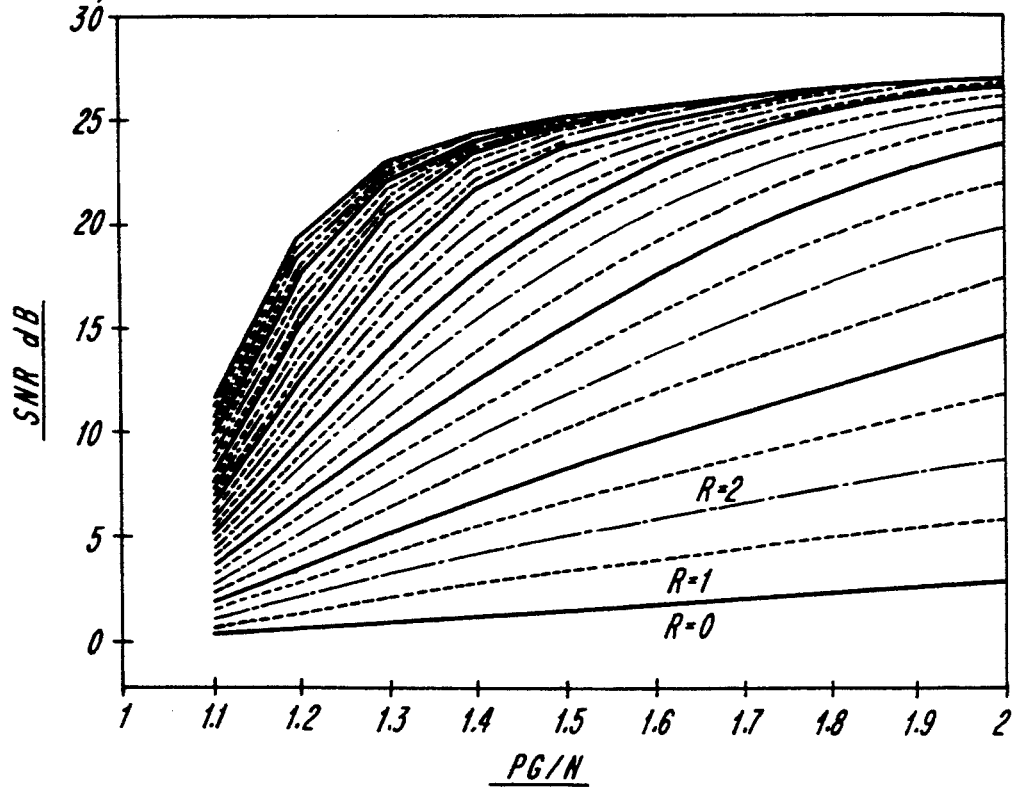
FIG. 11 illustrates theoretical performance characteristic for $E_b/\eta = 30$ dB.

FIG. 9 illustrates the performance characteristic for when $E_b/\eta = 20$ dB. With this bit energy to noise ratio, two iterations of the interference canceler can yield 6 dB improvement for PG/N=2. Similarly, FIGS. 10 and 11 shows that one iteration of the interference canceler can yield more than 10 dB improvement for PG/N=2.

It will be apparent to those skilled in the art that various modifications can be made to the spread-spectrum CDMA interference canceler and method of the instant invention without departing from the scope or spirit of the invention, and it is intended that the present invention cover modifications and variations of the spread-spectrum CDMA interference canceler and method provided they come within the scope of the appended claims and their equivalents.

We claim:

1. A spread-spectrum code division multiple access (CDMA) interference canceler for reducing interference in a spread-spectrum CDMA receiver having N channels, with each of the N channels identified by a distinct chip-code signal, comprising:

a plurality of means for generating a plurality of chip-code signals;

a plurality of despreading means, with each of said despreading means responsive to the respective distinct chip-code signal identifying a corresponding one of the N channels, for simultaneously despreading a plurality of spread-spectrum channels of a spread-spectrum CDMA signal as a plurality of despread signals, respectively;

a plurality of means for timing the plurality of chip-code signals thereby generating a timed version of the plurality of chip-code signals, respectively;

a plurality of means, responsive to the timed version of the plurality of chip-code-signals, for simultaneously spread-spectrum processing the plurality of despread signals, respectively, with a chip-code-signal corresponding to a respective despread signal;

means, for an $i^{th}$ chip-code signal, for subtracting from the spread-spectrum CDMA signal, simultaneously, each of the N-1 spread-spectrum-processed-despread signals, with the N-1 spread-spectrum-processed-despread signals not including a spread-spectrum processed-despread signal of the $i^{th}$ despread signal, thereby generating a subtracted signal; and channel means for despreading the subtracted signal with the $i^{th}$ chip-code signal as an $i^{th}$ channel.

2. The spread-spectrum CDMA interference canceler as set forth in claim 1 wherein each of said plurality of despreading means includes:

a filter;

a chip-code generator for generating a chip-code signal from a respective chip codeword; and a mixer coupled between said filter and said chip-code generator.

3. The spread-spectrum CDMA interference canceler as set forth in claim 1 wherein each of said plurality of despreading means includes a matched filter having an impulse response matched to a respective chip codeword.

4. The spread-spectrum CDMA interference canceler as set forth in claim 1 wherein said channel-despreading means includes:

a filter;

a chip-code generator for generating a chip-code signal from a chip codeword corresponding to the $i^{th}$ channel; and a mixer coupled between said filter and said chip-code generator.

5. The spread-spectrum CDMA interference canceler as set forth in claim 2 wherein said channel-despreading means includes:

a filter;

a chip-code generator for generating a chip-code signal from a chip codeword corresponding to the $i^{th}$ channel; and a mixer coupled between said filter and said chip-code generator.

6. The spread-spectrum CDMA interference canceler as set forth in claim 3 wherein said channel-despreading means includes:
  a filter;
  a chip-code generator for generating a chip-code signal from a chip codeword corresponding to the $i^{th}$ channel; and
  a mixer coupled between said filter and said chip-code generator.

7. The spread-spectrum CDMA interference canceler as set forth in claim 3 wherein said channel-despreading means includes a matched filter having an impulse response matched to a chip codeword corresponding to the $i^{th}$ channel.

8. The spread-spectrum CDMA interference canceler as set forth in claim 1 wherein each of said despreading means includes a digital signal processor with digital matched filter having an impulse response matched to a respective chip codeword.

9. The spread-spectrum CDMA interference canceler as set forth in claim 8 wherein said channel-despreading means includes a matched filter having an impulse response matched to a chip codeword corresponding to the $i^{th}$ channel.

10. The spread-spectrum CDMA interference canceler as set forth in claim 1 wherein said channel-despreading means includes a digital signal processor with digital matched filter having an impulse response matched to a chip codeword corresponding to the $i^{th}$ channel.

11. The spread-spectrum CDMA interference canceler as set forth in claim 8 wherein said channel-despreading means includes a surface acoustic wave (SAW) device having an impulse response matched to a chip codeword corresponding to the $i^{th}$ channel.

12. The spread-spectrum CDMA interference canceler as set forth in claim 1 wherein each of said plurality of despreading means includes a surface acoustic wave (SAW) device having an impulse response matched to a chip codeword corresponding to the $i^{th}$ channel.

13. The spread-spectrum CDMA interference canceler as set forth in claim 12 wherein said channel-despreading means includes a matched filter having an impulse response matched to a chip codeword corresponding to the $i^{th}$ channel.

14. The spread-spectrum CDMA interference canceler as set forth in claim 12 wherein said channel-despreading means includes a chip-code generator for generating a chip-code signal from a digital matched filter having an impulse response matched to a chip codeword corresponding to the $i^{th}$ channel.

15. The spread-spectrum CDMA interference canceler as set forth in claim 12 wherein said channel-despreading means includes a surface acoustic wave (SAW) device having an impulse response matched to a chip codeword corresponding to the $i^{th}$ channel.

16. A spread-spectrum code division multiple access (CDMA) interference canceler for reducing interference in a spread-spectrum CDMA receiver having N channels, with each of the N channels identified by a distinct chip-code signal, comprising:
  a plurality of chip-code-signal generators for generating, simultaneously, a plurality of chip-code signals;
  a plurality of correlators, responsive to a plurality of distinct chip-code-signals, for simultaneously despreading a plurality of spread-spectrum channels of a spread-spectrum CDMA signal as a plurality of despread signals, respectively;
  a plurality of delay devices coupled to said plurality of chip-code-signal generators for delaying the plurality of chip-code signals as a timed plurality of chip-code signals, respectively;
  a plurality of mixers, responsive to the timed plurality of chip-code signals, for spread-spectrum processing, simultaneously, the plurality of despread signals, respectively, with a chip-code-signal corresponding to a respective despread signal;
  a subtractor, for an $i^{th}$ chip-code signal, for subtracting from the spread-spectrum CDMA signal, simultaneously, each of the N-1 spread-spectrum-processed-despread signals, with the N-1 spread-spectrum-processed-despread signals not including a spread-spectrum processed despread signal of the $i^{th}$ despread signal, thereby generating a subtracted signal; and
  a channel correlator for despreading the subtracted signal with the $i^{th}$ chip-code signal as an $i^{th}$ channel.

17. A spread-spectrum code division multiple access (CDMA) interference canceler for reducing interference in a spread-spectrum CDMA receiver having N chip-code channels, with each of the N channels identified by a distinct chip-code signal, comprising:
  a plurality of matched filters, responsive to a plurality of distinct chip-code signals, for simultaneously despreading a plurality of spread-spectrum channels of a spread-spectrum CDMA signal as a plurality of despread signals, respectively;
  a plurality of chip-code-signal generators, responsive to a plurality of despread signals from the plurality of matched filters, for generating a timed plurality of chip-code signals, respectively;
  a plurality of mixers, responsive to the plurality of despread signals from the plurality of matched filters and the timed plurality of chip-code signals from the plurality of chip-code-signal generators, respectively, for spread-spectrum processing, simultaneously, the plurality of despread signals, respectively, with a timed chip-code signal corresponding to a respective despread signal;
  a subtractor, for an $i^{th}$ chip-code signal, for subtracting from the spread-spectrum CDMA signal, simultaneously, each of the N-1 spread-spectrum-processed-despread signals, with the N-1 spread-spectrum-processed-despread signals not including a spread-spectrum processed despread signal of the $i^{th}$ despread signal, thereby generating a subtracted signal; and
  a channel matched filter for despreading the subtracted signal with the $i^{th}$ chip-code-signal as an $i^{th}$ channel.

18. A method for reducing interference in a spread-spectrum code division multiple access (CDMA) receiver having N channels, with each of the N channels identified by a distinct chip-code signal, comprising the steps of:
  despreading a spread-spectrum CDMA signal as a plurality of despread signals, respectively;
  spread-spectrum processing, simultaneously, using a timed version of the plurality of chip-code-signals, the plurality of despread signals, respectively, with a chip-code signal corresponding to a respective despread signal;
  subtracting from the spread-spectrum CDMA signal, simultaneously, each of the N-1 spread-spectrumprocessed-despread signals, with the N-1 spread-spectrum-processed-despread signals not including a spread-spectrum processed despread signal of the $i^{th}$ despread signal, thereby generating a subtracted signal; and despreading the subtracted signal with the $i^{th}$ chip-code signal as an $i^{th}$ channel.

19. The method as set forth in claim 18 wherein the first step of despreading includes the step of correlating the spread-spectrum CDMA signal as a plurality of despread signals.

20. The method as set forth in claim 18 wherein the first step of despreading includes the step of matched filtering the spread-spectrum CDMA signal as a plurality of despread signals.

21. A method for reducing interference in a spread-spectrum code division multiple access (CDMA) receiver having N channels, with each of the N channels identified by a distinct chip-code signal, using a first plurality of interference cancelers, comprising the steps, within each of said plurality of interference cancelers, of:

a. despreading, simultaneously, a plurality of spread-spectrum channels of a spread-spectrum CDMA signal as a plurality of despread signals, respectively;

b. spread-spectrum processing, simultaneously, using a timed version of the plurality of chip-code-signals, the plurality of despread signals, respectively, with a chip-code signal corresponding to a respective despread signal;

c. subtracting from the spread-spectrum CDMA signal, each of the N-1 spread-spectrum-processed-despread signals, with the N-1 spread-spectrum-processed-despread signals not including a spread-spectrum processed despread signal of the $i^{th}$ despread signal, thereby generating a subtracted signal;

d. despreading the subtracted signal with the $i^{th}$ chip-code signal as an $i^{th}$ channel, producing a first set of estimates of the N channels;

e. repeating steps a through d, using a second plurality of interference cancelers, producing a second set of estimates of the N channels; and f. repeating steps a through d, using an $M^{th}$ plurality of interference cancelers, producing an $M^{th}$ set of estimates of the N channels.

22. A spread-spectrum code division multiple access (CDMA) interference canceler for reducing interference in a spread-spectrum CDMA receiver having N channels, with each of the N channels identified by a distinct chip-code signal, comprising:

a plurality of chip-code-signal generators for generating, simultaneously, a plurality of chip-code signals;

a plurality of correlators, responsive to a plurality of distinct chip-code-signals, for simultaneously despreading a plurality of spread-spectrum channels of a spread-spectrum CDMA signal as a plurality of despread signals, respectively;

a plurality of delay devices coupled to said plurality of chip-code-signal generators for delaying the plurality of chip-code signals as a timed plurality of chip-code signals, respectively;

a plurality of mixers, responsive to the timed plurality of chip-code signals, for spread-spectrum processing, simultaneously, the plurality of despread signals, respectively, with a chip-code-signal corresponding to a respective despread signal, producing N spread-spectrum-processed-despread signals;

a plurality of subtractors, each of said plurality of subtractors for subtracting from the spread-spectrum CDMA signal all but a particular one of the N spread-spectrum-processed-despread signals, with the particular one of the N spread-spectrum-processed-despread signals being different for each of said plurality of subtractors, thereby generating a plurality of subtracted signals; and a plurality of channel correlators for despreading the plurality of subtracted signals with a particular one of the plurality of chip-code signals, respectively, as a plurality of channels.

23. A spread-spectrum code division multiple access (CDMA) interference canceler for reducing interference in a spread-spectrum CDMA receiver having N channels, with each of the N channels identified by a distinct chip-code signal, comprising:

a plurality of chip-code-signal generators for generating, simultaneously, a plurality of chip-code signals;

a plurality of correlators, responsive to a plurality of distinct chip-code-signals, for simultaneously despreading a plurality of spread-spectrum channels of a spread-spectrum CDMA signal as a plurality of despread signals, respectively;

a plurality of delay devices coupled to said plurality of chip-code-signal generators for delaying the plurality of chip-code signals as a timed plurality of chip-code signals, respectively;

a plurality of mixers, responsive to the timed plurality of chip-code signals, for spread-spectrum processing, simultaneously, the plurality of despread signals, respectively, with a chip-code-signal corresponding to a respective despread signal, producing N spread-spectrum-processed-despread signals;

a first subtractor, for subtracting from the spread-spectrum CDMA signal, all but a first one of the N spread-spectrum-processed-despread signals, thereby generating a first subtracted signal;

a second subtractor, for subtracting from the spread-spectrum CDMA signal, all but a second one of the N spread-spectrum-processed-despread signals, thereby generating a second subtracted signal; and an $n^{th}$ subtractor, for subtracting from the spread-spectrum CDMA signal, all but an $n^{th}$ one of the N spread-spectrum-processed-despread signals, thereby generating an $n^{th}$ subtracted signal;

a first channel correlator for despreading the first subtracted signal with a first chip-code signal as an estimate of a first channel;

a second channel correlator for despreading the second subtracted signal with a second chip-code signal as an estimate of a second channel; and an $n^{th}$ channel correlator for despreading the $n^{th}$ subtracted signal with an $n^{th}$ chip-code signal as an estimate of an $n^{th}$ channel.

24. A spread-spectrum code division multiple access (CDMA) interference canceler for reducing interference in a spread-spectrum CDMA receiver having N channels, with each of the N channels identified by a distinct chip-code signal, comprising:

a plurality of matched filters, responsive to a plurality of distinct chip-code-signals, for despreading, simultaneously, a plurality of spread-spectrum channels of a spread-spectrum CDMA signal as a plurality of despread signals, respectively;

a plurality of chip-code-signal generators, responsive to a plurality of despread signals from the plurality of matched filters, for generating, simultaneously, a timed plurality of chip-code signals, respectively;

a plurality of mixers, responsive to the plurality of despread signals from the plurality of matched filters and the timed plurality of chip-code signals from the plurality of chip-code-signal generators, respectively, for spread-spectrum processing, simultaneously, the plurality of despread signals, respectively, with a timed chip-code signal corresponding to a respective despread signal, producing N spread-spectrum-processed-despread signals;

a plurality of subtractors, each of said plurality of subtractors for subtracting from the spread-spectrum CDMA signal all but a particular one of the N spread-spectrum-processed-despread signals, with the particular one of the N spread-spectrum-processed-despread signals being different for each of said plurality of subtractors, thereby generating a plurality of subtracted signals; and a plurality of channel-matched filters for despreading the plurality of subtracted signals with a particular one of the plurality of distinct chip-code signals, respectively, as a plurality of channels.

25. A spread-spectrum code division multiple access (CDMA) interference canceler for reducing interference in a spread-spectrum CDMA receiver having N channels, with each of the N channels identified by a distinct chip-code signal, comprising:

a plurality of matched filters, responsive to a plurality of distinct chip-code-signals, for simultaneously despreading a plurality of spread-spectrum channels of a spread-spectrum CDMA signal as a plurality of despread signals, respectively;

a plurality of chip-code-signal generators, responsive to a plurality of despread signals from the plurality of matched filters, for generating, simultaneously, a timed plurality of chip-code signals, respectively;

a plurality of mixers, responsive to the plurality of despread signals from the plurality of matched filters and the timed plurality of chip-code signals from the plurality of chip-code-signal generators, respectively, for spread-spectrum processing, simultaneously, the plurality of despread signals, respectively, with a timed chip-code signal corresponding to a respective despread signal, producing N spread-spectrum-processed-despread signals;

a first subtractor, for subtracting from the spread-spectrum CDMA signal, all but a first one of the N spread-spectrum-processed-despread signals, thereby generating a first subtracted signal;

a second subtractor, for subtracting from the spread-spectrum CDMA signal, all but a second one of the N spread-spectrum-processed-despread signals, thereby generating a second subtracted signal; and an $n^{th}$ subtractor, for subtracting from the spread-spectrum CDMA signal, all but an $n^{th}$ one of the N spread-spectrum-processed-despread signals, thereby generating an $n^{th}$ subtracted signal;

a first channel-matched filter for despreading the first subtracted signal with a first chip-code signal as an estimate of a first channel;

a second channel-matched filter for despreading the second subtracted signal with a second chip-code signal as an estimate of a second channel; and an $n^{th}$ channel-matched filter for despreading the $n^{th}$ subtracted signal with an $n^{th}$ chip-code signal as an estimate of an $n^{th}$ channel.

* * * * *